United States Patent
Yokotani

(10) Patent No.: US 8,422,881 B2
(45) Date of Patent: Apr. 16, 2013

(54) OPTICAL ACCESS NETWORK

(75) Inventor: Tetsuya Yokotani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 414 days.

(21) Appl. No.: 12/601,627

(22) PCT Filed: May 25, 2007

(86) PCT No.: PCT/JP2007/060712
§ 371 (c)(1),
(2), (4) Date: Nov. 24, 2009

(87) PCT Pub. No.: WO2008/146344
PCT Pub. Date: Dec. 4, 2008

(65) Prior Publication Data
US 2010/0183300 A1   Jul. 22, 2010

(51) Int. Cl.
*H04B 10/00* (2006.01)
(52) U.S. Cl.
USPC ................................. 398/1; 398/72
(58) Field of Classification Search ........... 398/66–73, 398/1
See application file for complete search history.

(56) References Cited

U.S. PATENT DOCUMENTS

| | | | | |
|---|---|---|---|---|
| 7,313,330 B2 * | 12/2007 | Kim et al. | ......... | 398/72 |
| 7,330,654 B2 * | 2/2008 | Song et al. | ......... | 398/71 |
| 7,613,187 B2 * | 11/2009 | Choi et al. | ......... | 370/392 |
| 7,639,694 B2 * | 12/2009 | DeCarolis et al. | ......... | 370/395.4 |
| 7,676,154 B2 * | 3/2010 | Vukovic et al. | ......... | 398/57 |
| 7,701,939 B2 * | 4/2010 | Tanaka | ......... | 370/390 |
| 7,756,418 B2 * | 7/2010 | Ofalt et al. | ......... | 398/25 |
| 7,852,880 B2 * | 12/2010 | Solomon et al. | ......... | 370/498 |
| 7,886,143 B2 * | 2/2011 | Qi et al. | ......... | 713/153 |
| 7,925,161 B2 * | 4/2011 | Vukovic et al. | ......... | 398/57 |
| 7,962,038 B2 * | 6/2011 | Chen | ......... | 398/69 |
| 7,974,207 B2 * | 7/2011 | Bitar | ......... | 370/235 |
| 7,990,853 B2 * | 8/2011 | Brolin | ......... | 370/229 |
| 8,059,526 B2 * | 11/2011 | Kanthamneni et al. | ......... | 370/217 |
| 2004/0033077 A1 * | 2/2004 | Kim et al. | ......... | 398/72 |
| 2006/0285536 A1 * | 12/2006 | Gerard Pauwels | ......... | 370/352 |

(Continued)

FOREIGN PATENT DOCUMENTS

| | | |
|---|---|---|
| JP | 2002-57679 | 2/2002 |
| JP | 2002-152135 | 5/2002 |
| WO | WO 02/49290 A1 | 6/2002 |

OTHER PUBLICATIONS

Japanese Office Action issued Oct. 11, 2011, in Patent Application No. 2009-516085.

(Continued)

*Primary Examiner* — Agustin Bello
(74) *Attorney, Agent, or Firm* — Oblon, Spivak, McClelland, Maier & Neustadt, L.L.P.

(57) ABSTRACT

Provided is an optical access network capable of realizing protection control without affecting an E-PON for providing an Ethernet service. In the optical access network comprising the E-PON having a transmission line which is duplexed between an OLT and a plurality of ONTs, the OLT includes a layer-2 (L2) control section in which a protocol, in which protection control information is provided, as a protocol structure, above an Ethernet media access control (MAC), is mounted. Further, the OLT has a protocol structure in which the protection control information is provided independently from the Ethernet MAC to transfer user data and the protection control information.

7 Claims, 4 Drawing Sheets

U.S. PATENT DOCUMENTS

2008/0232804 A1* 9/2008 Absillis .......................... 398/71
2008/0259786 A1* 10/2008 Gonda ........................... 370/218
2011/0211827 A1* 9/2011 Soto et al. ...................... 398/25

OTHER PUBLICATIONS

Hiroshi Ohta, "Standardization Status on OAM and QoS issues for Carrier-Class Ethernet", The Institute of Electronics, Information and Communication Engineers, Technical Report of IEICE, CS 2004-84, vol. 104, No. 380, Oct. 2004, pp. 29-34.

Tetsuya Yokotani et al, "Simplified PON Protection Mechanism using L2 Control Protocols", The Institute of Electronics, Information and Communication Engineers, Technical Report of IEICE, vol. 102, No. 692, 2003, pp. 141-144. (with English Abstract).

* cited by examiner

OPTICAL ACCESS NETWORK

TECHNICAL FIELD

The present invention relates to a construction of an optical access network which requires high-reliability information transfer.

BACKGROUND ART

A passive optical network (PON) system has been employed for an optical access network including a fiber to the home (FTTH). In the PON system, a point-to-multipoint structure is provided from an optical line terminal (OLT) to a plurality of optical network terminals (ONTs). Communication from the OLT to the ONT is called downlink communication. Information is distributed through broadcast. Only information for each user is passed through a corresponding ONT. In contrast, communication from the ONT to the OLT is called uplink communication. A transmission enable signal called a grant is transmitted from the OLT to the ONT, and information may be transmitted to the OLT from an ONT designated by the transmission enable signal.

There is provided PON protection as high-reliability control in the PON system. The PON protection is achieved using a duplexed transmission line in a PON section. The PON protection may be useful for business use or multicast communication for which high reliability is required. In particular, though the PON protection requires high reliability in software distribution and information broadcast, the PON protection is required for improving the reliability on a transmission level in an application in which transmission may not be confirmed because of communication through multicast.

With respect to the PON protection, PON systems which are described in Patent Documents 1 to 3 and specified in ITU-T G.983.1 and the recommendation of ITU-T G.983.5 which is described in Non-patent Document 1 are provided as conventional technologies.

According to Patent Documents 1 to 3, protection control using an operation administration and maintenance (OAM) cell as a physical layer is performed in an ATM-PON which is an ATM-based PON or a B-PON, which is specified in ITU-T G.983.1. A PON topology is a point-to-multipoint structure. According to the systems, path switch information called K1 and K2 specified in ITU-T G.783 are mapped on the OAM cell as the physical layer. Therefore, even in the PON topology, the same control as point-to-point determined in ITU-T G.783 may be realized.

In ITU-T G.983.5 described in Non-patent Document 1, a protection system in the PON system specified in ITU-T G.983.1 is specified. In this case, information specified in ITU-T G.783 is transferred onto the PON by using the OAM cell to realize switching from a current transmission line to an auxiliary transmission line.

In ITU-T G.983.5, there are a tree switch and a branch switch. A condition of the former is that all ONTs are made redundant. At the time of occurrence of fault, simultaneous switching is performed by an OLT-side interface. On the other hand, in the latter, an environment in which an ONT which is made redundant and an ONT which is not made redundant are mixed is assumed. In this case, both OLT-side interfaces operate. Therefore, switching is performed only when a fault occurs in an ONT-side interface. In ITU-T G.983.5, the ATM is assumed as transmission means. Thus, in the case of the tree switch, an OAM at a physical interface level detects a fault and controls switching. In the case of the branch switch, an OAM at a VP level of an ATM layer is used.

Patent Document 1: JP 2002-152135 A
Patent Document 2: JP 2002-57679 A
Patent Document 3: WO 2002/049290
Non-patent Document 1: ITU-T G.983.5(01/2002)

DISCLOSURE OF THE INVENTION

Problem to be Solved by the Invention

In the conventional technologies, when the PON protection is to be performed, the ATM is assumed as the transmission means. When recent circumstances of the FTTH are taken into account, Ethernet (registered trademark) becomes mainstream instead of the ATM. In other words, a main system is an Ethernet passive optical network (E-PON) which is capable of directly accommodating Ethernet without through the ATM (target in Japan is Giga-Ethernet, and hence the E-PON is called a Gigabit Ethernet-passive optical network (GE-PON) in many cases). This system is normalized in IEEE802.3ah.

However, the conventional technologies may not be applied to the GE-PON because Ethernet is not assumed. Specifically, in the case of the GE-PON, there are no regulations on the protection in the framework of the OAM.

The present invention has been made in view of the point described above. It is an object of the present invention to obtain an optical access network capable of realizing protection control without affecting the E-PON for providing an Ethernet service.

Means for Solving the Problem

According to one aspect of the present invention, in an optical access network comprising an Ethernet passive optical network (E-PON) having a transmission line which is duplexed between an optical line terminal (OLT) and a plurality of optical network terminals (ONTs), the optical access network is characterized in that the OLT includes a layer-2 (L2) control section in which a protocol, in which protection control information is provided, as a protocol structure, above an Ethernet media access control (MAC), is mounted.

According to another aspect of the present invention, in an optical access network comprising an Ethernet passive optical network (E-PON) having a transmission line which is duplexed between an optical line terminal (OLT) and a plurality of optical network terminals (ONTs), the optical access network is characterized in that the OLT includes a protocol structure in which protection control information is provided independently from an Ethernet media access control (MAC), as a protocol structure, to transfer user data and the protection control information.

Effects of the Invention

According to the present invention, the protection control may be realized without affecting the E-PON for providing the Ethernet service.

BEST MODE FOR CARRYING OUT THE INVENTION

Embodiment 1

Figure 1:
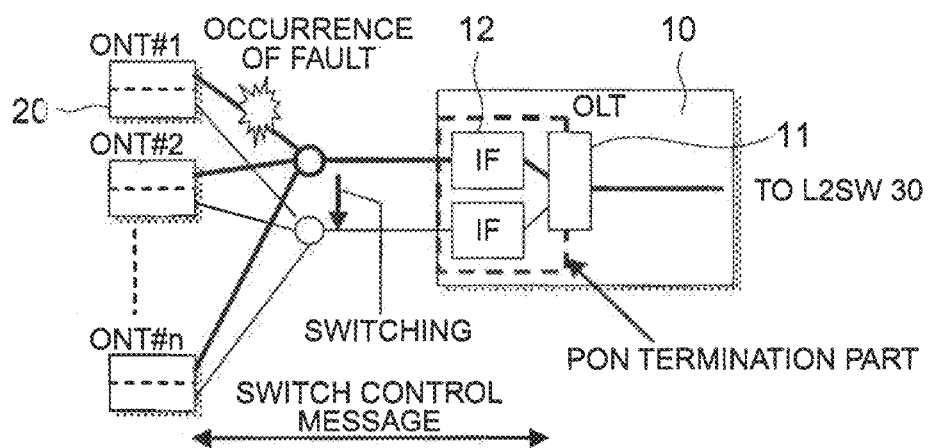
FIG. 1 is a block diagram illustrating a structure of an optical access network according to Embodiments 1 and 2 of the present invention, which illustrates a case of a switch structure using a tree switch when a fault occurs.
Figure 2:
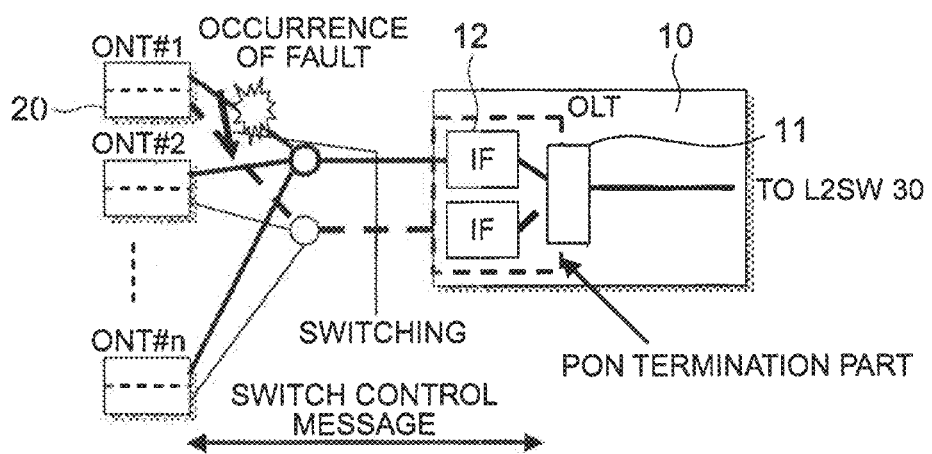
FIG. 2 is a block diagram illustrating a structure of the optical access network according to Embodiments 1 and 2 of the present invention, which illustrates a case of a switch structure using a branch switch when a fault occurs.

FIGS. 1 and 2 are block diagrams illustrating a structure of an optical access network according to Embodiment 1 of the present invention, which illustrate a system structure in a passive optical network (PON) section. As illustrated in FIGS. 1 and 2, an optical line terminal (OLT) 10 includes a layer-2 (L2) control section 11 and a pair of interfaces (IF) 12 in a PON termination part, and a transmission line is duplexed in the PON section, thereby providing a point-to-multipoint structure for a plurality of optical network terminals (ONTs) 20. A layer-2 switch (L2SW) 30 is provided in a subsequent stage of the OLT 10 so as to be connected thereto. FIGS. 1 and 2 illustrate switching between the IFs 12 which is performed upon occurrence of a fault based on switch control messages which are transmitted and received between the OLT 10 and the plurality of ONTs 20 when the fault occurs. FIG. 1 illustrates a case of a switch structure using a tree switch, and FIG. 2 illustrates a case of a switch structure using a branch switch.

Figure 3:
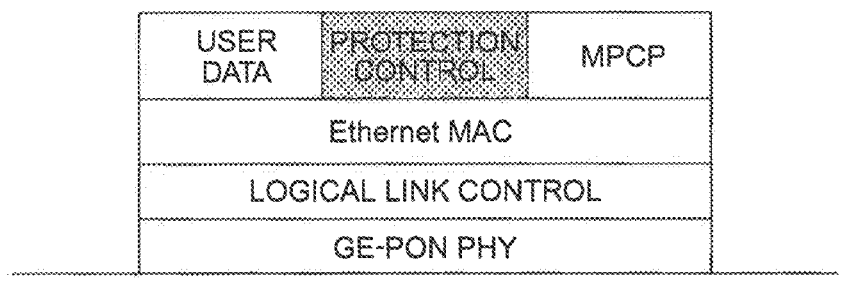
FIG. 3 illustrates a protocol structure in a case of a GE-PON.
Figure 4:
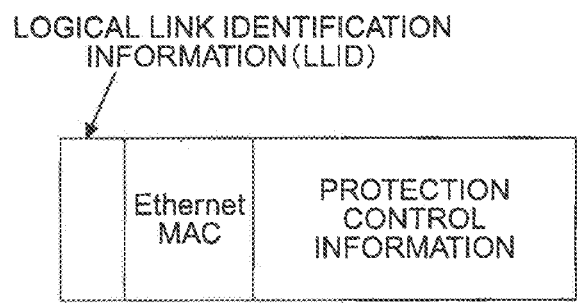
FIG. 4 illustrates a frame format for carrying information for protection control.

FIG. 3 illustrates a protocol structure in a case of a GE-PON. FIG. 4 illustrates a frame format for carrying information for protection control. In the case of the GE-PON, as illustrated in FIG. 3, a multi-point control protocol (MPCP) for controlling an optical network unit (ONU) from the OLT 10 is mounted on an Ethernet media access control (MAC).

In the GE-PON, a plurality of logical link controls are provided on a GE-PON physical layer (PHY). Uplink grant control is performed for each logical link. The MAC for Ethernet is mounted for each logical link. Whether data is data of the MPCP or user data is recognized based on a protocol type of the MAC. In order to perform the protection control in the GE-PON, a protection control section is mounted on the Ethernet MAC.

In the structure illustrated in FIGS. 1 and 2, an MPCP region is terminated at the IFs 12 of the OLT 10 to perform the GE-PON control. In contrast, the protection control is transferred to the L2 control section 11. The L2 control section 11 selects an interface for transferring or receiving information transferred from both the IFs 12. The user data is transferred from the L2 control section 11 to the L2SW 30. The L2SW 30 recognizes that the number of protected interface is one.

As illustrated in FIG. 4, protection control information used here is assumed to be information which is the same as in a conventional example and specified in ITU-T G.783. In the case of the GE-PON, as illustrated in FIG. 3, the Ethernet MAC is mounted on the logical link control, and the MPCP and the protection control section are mounted on the Ethernet MAC. Therefore, the protection control is performed for each logical link. At least one logical link is set for the ONU, and hence the branch switch illustrated in FIG. 2 may be realized.

According to Embodiment 1, the OLT 10 includes the L2 control section 11 in which the protocol provided with the protection control information above the Ethernet MAC as a protocol structure is mounted, and hence the protection control may be realized without affecting the GE-PON for providing the Ethernet service. The protection control is mounted on the Ethernet MAC, and hence a protection function may be realized without affecting a currently specified GE-PON framework.

Embodiment 2

In Embodiment 2, the same structure in Embodiment 1 is provided, except that a logical link control protocol (LACP) specified in IEEE802.3ad instead of ITU-T G.783 is used as the protection control information employed in Embodiment 1.

According to Embodiment 2, even when the LACP specified in IEEE802.3ad instead of ITU-T G.783 is used as the protection control protocol, the protection control may be realized without affecting the GE-PON for providing the Ethernet service, as in Embodiment 1. The protection control is mounted on the Ethernet MAC, and hence the protection function may be realized without affecting the currently specified GE-PON framework.

Embodiment 3

Figure 5:
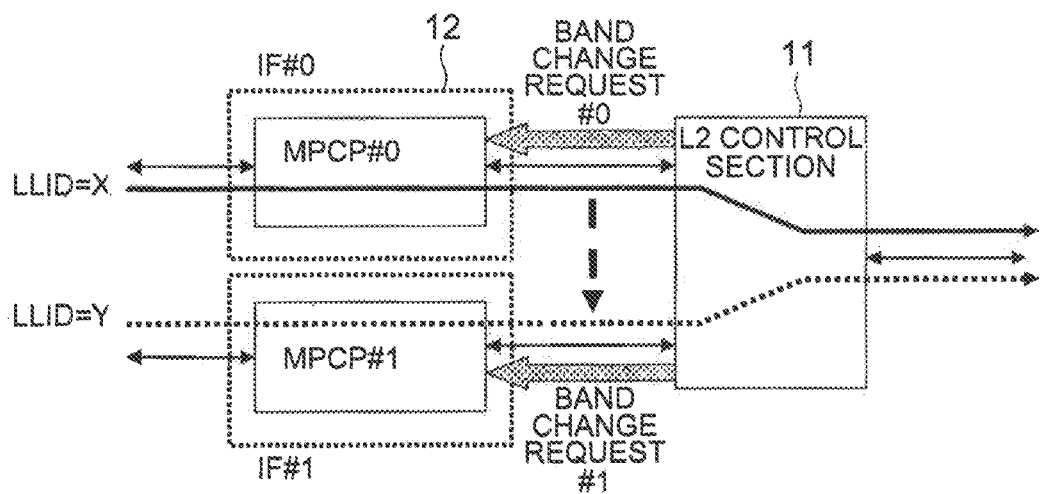
FIG. 5 is an explanatory diagram illustrating Embodiment 3 of the present invention, which illustrates a linking operation between an L2 control section and an IF.

FIG. 5 is an explanatory diagram illustrating Embodiment 3 of the present invention, which illustrates linking between the L2 control section 11 and the IFs 12 in Embodiment 1. FIG. 5 illustrates a case where communication in which a logical link identifier LLID is X is changed by the branch switch into communication in which the logical link identifier LLID is Y and shifted to a redundant system, in response to a band change request from the L2 control section.

FIG. 5 illustrates the case where communication using a path whose logical link identifier LLID is X is shifted to communication using a path whose logical link identifier LLID is Y because of the occurrence of fault, and such switch control is performed by the L2 control section 11. At this time, a switch notification is sent as the band change request from the L2 control section 11 to the MPCPs of the IFs 12. In the MPCP, a grant is generated for each logical link for the ONT connected thereto to control an uplink communication band. In this case, the communication in which the logical link identifier LLID is X is interrupted, and hence the band assignment to the communication concerned is stopped and a remaining band is assigned to other communication. In contrast, the new communication in which the logical link identifier LLID is Y starts, and hence the band assignment to the communication in which the logical link identifier LLID is Y is performed.

According to Embodiment 3, a band assigned to communication with a logical link to be switched by the L2 control section 11 is reduced and a band associated with a logical link after switching is increased, and hence the band may be effectively used. Specifically, a band is not assigned to a logical link which is not used because of a fault, and the band is assigned to another logical link capable of communication. Therefore, efficient communication may be expected.

Embodiment 4

Figure 6:
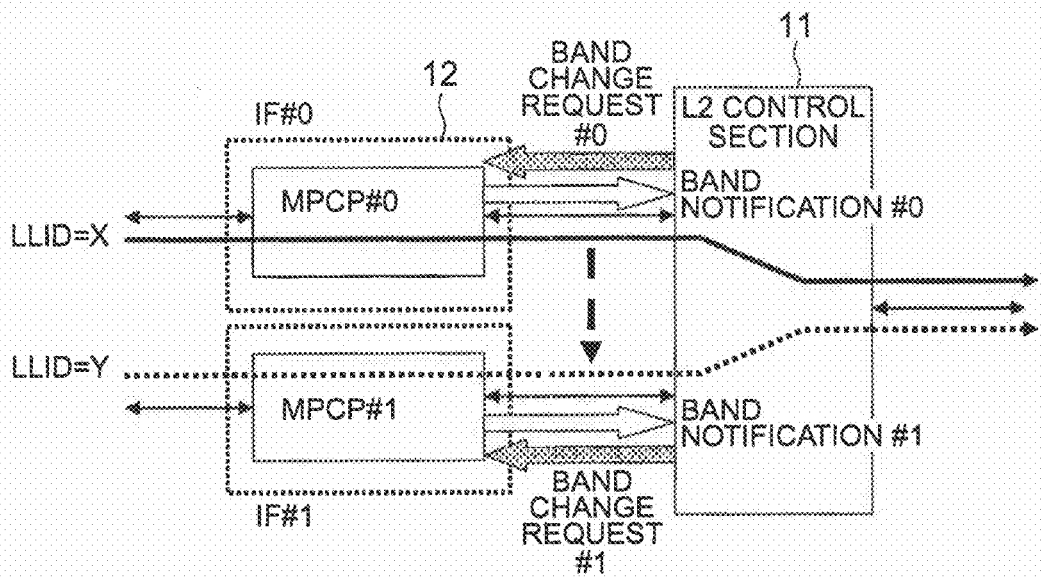
FIG. 6 is an explanatory diagram illustrating Embodiment 4 of the present invention, which illustrates that control paths between MPCPs and an L2 control section are further provided to send band notifications for respective logical links.

FIG. 6 is an explanatory diagram illustrating Embodiment 4 of the present invention, which illustrates linking between the L2 control section 11 and the IFs 12 in Embodiment 1. According to the structure illustrated in FIG. 6, band notifications for further providing control paths are sent from the MPCPs provided in the respective IFs 12 of the OLT 10 to the L2 control section 11 in addition to the structure illustrated in FIG. 5 according to Embodiment 3. The band notifications are sent for the respective logical links at a present time from the MPCPs through the control paths.

A notification of a band assigned at a present time is sent from an MPCP to the L2 control section 11. When switching is performed by the L2 control section 11 because of the occurrence of the fault, information associated with the band notification from the MPCP is applied to a communication path for starting new communication (communication in which logical link identifier LLID is Y in case of FIG. 6).

According to Embodiment 4, the L2 control section 11 monitors the band assigned to the logical link by the MPCP provided in each of the IFs 12 of the OLT 10. The band associated with the logical link switched when switching occurs is taken over as the band associated with the logical link after switching. Thus, when the path is changed because of the fault, the band of the uplink communication is taken over, and hence there is an effect that the same communication quality as before the occurrence of the fault may be maintained, in addition to the effect of Embodiment 3.

Embodiment 5

Figure 7:
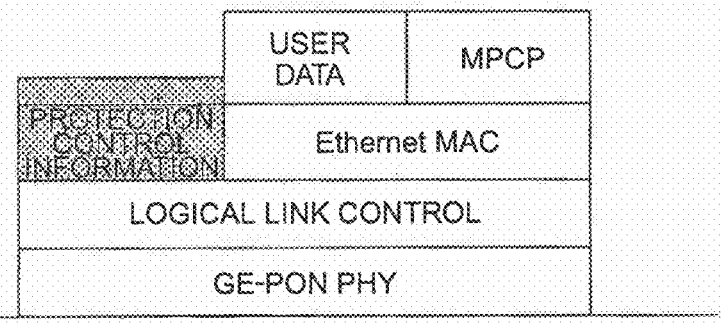
FIG. 7 is an explanatory diagram illustrating Embodiment 5 of the present invention, which illustrates a case where protection control information is transferred separate from an Ethernet MAC.
Figure 8:
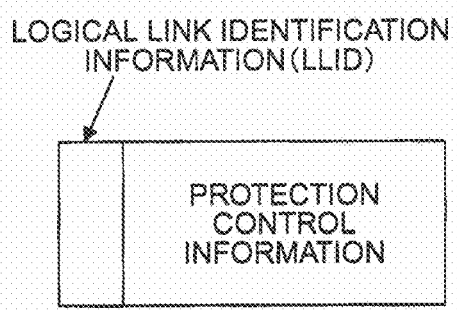
FIG. 8 is an explanatory diagram illustrating Embodiment 5 of the present invention, which illustrates a frame format in the case where the protection control information is transferred separate from the Ethernet MAC.

FIG. 7 is an explanatory diagram illustrating Embodiment 5 of the present invention, which illustrates an embodiment for carrying the protection control information onto the GE-PON in a case where the protection control information is transferred separate from the Ethernet MAC. FIG. 8 illustrates a frame format in this case.

In FIG. 7, the protection control information is transferred without going through a frame form of the Ethernet MAC. In this case, the logical link identification information LLID for carrying the protection control information separate from user data is separately provided for each ONT. The protection control information is carried through the link. As illustrated in FIG. 8, in a frame structure, the protection control information is described immediately after the logical link identification information LLID.

According to Embodiment 5, in the OLT 10, the protection control information is provided independently from the Ethernet MAC in a protocol structure, and the user data and the protection control information are transferred while the logical links are separated from each other. Therefore, the protection control information is transferred without going through the frame of the Ethernet MAC, and hence a protocol overhead may be reduced. In other words, there is an effect that the band for transferring the protection control information is reduced.

Embodiment 6

Figure 9:
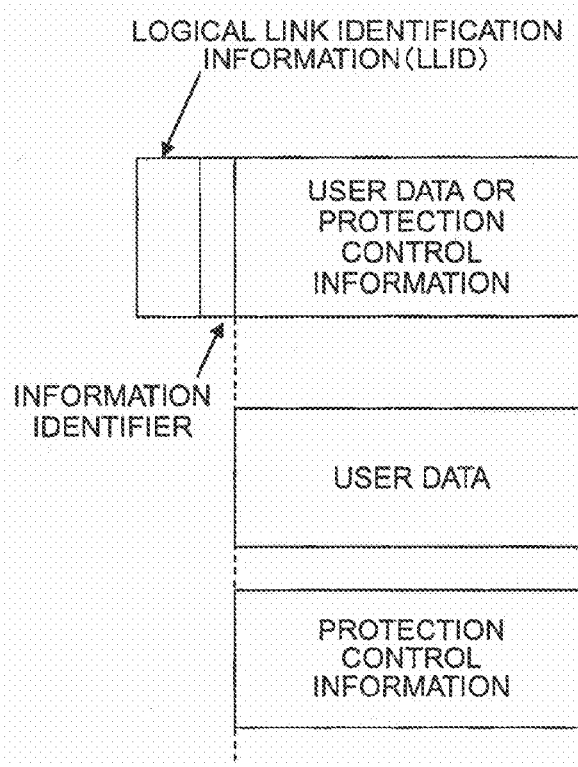
FIG. 9 is an explanatory diagram illustrating Embodiment 6 of the present invention, which illustrates that user data and the protection control information are transmitted using the same logical link.

FIG. 9 is an explanatory diagram illustrating Embodiment 6 of the present invention, which illustrates that the user data and the protection control information are transmitted using the same logical link. In FIG. 9, the user data and the protection control information are transmitted using the same logical link. Therefore, a region (information identifier) for distinguishing the protection control information and the user data from each other is provided. Thus, the protection control information is transmitted using the same logical link as the user data without going through the Ethernet MAC.

According to Embodiment 6, in the OLT 10, the logical link for transferring the user data and the logical link for transferring the protection control information are made common to each other, and the region for distinguishing the protection control information and the user data from each other is provided after the logical link identifier located in the head of the frame. Therefore, the number of logical links may be reduced.

The invention claimed is:

1. An optical access network system comprising:
an optical line terminal (OLT) and a plurality of optical network terminals (ONTs) forming an Ethernet passive optical network (E-PON) having a transmission line which is duplexed between the OLT and the ONTs, wherein
the OLT comprises a layer-2 (L2) control section configured to insert a protocol, in which protection control information is provided, as part of a protocol structure, on a layer above an Ethernet media access control (MAC) layer and a logical link control (LLC) layer.

2. An optical access network according to claim 1, wherein the L2 control section comprises protection control protocol information specified in ITU-T G.783 or IEEE802.3ad.

3. An optical access network according to claim 1, wherein the L2 control section is configured to reduce a band assigned to communication with a switched logical link and increase a band associated with a logical link after switching.

4. An optical access network according to claim 3, wherein the L2 control section is configured to monitor the band assigned to the logical link by a multi-point control protocol (MPCP) provided in each of interfaces of the OLT, and take over the band associated with the switched logical link when the switching occurs as the band associated with the logical link after the switching.

5. An optical access network system comprising:
an optical line terminal (OLT) and a plurality of optical network terminals (ONTs) forming an Ethernet passive optical network (E-PON) having a transmission line which is duplexed between the OLT and the ONTs,
wherein the OLT is configured to generate data that includes a protocol structure in which protection control information is provided independently from an Ethernet media access control (MAC), to transfer user data and the protection control information, such that the protection control information shares a same layer as the Ethernet MAC layer within the protocol structure and is provided above a logical link control (LLC) layer.

6. An optical access network according to claim 5, wherein, in the OLT, a logical link for transferring the user data and a logical link for transferring the protection control information are made common to each other, and a region for distinguishing the protection control information and the user data from each other is provided after a logical link identifier located in a head of a frame.

7. A method, implemented on an optical access network system which includes an optical line terminal (OLT) and a plurality of optical network terminals (ONTs) forming an Ethernet passive optical network (E-PON) having a transmission line which is duplexed between the OLT and the ONTs, the method comprising:

inserting, at the OLT, a protocol, in which protection control information is provided, as part of a protocol structure, on a layer above an Ethernet media access control (MAC) layer and a logical link control (LLC) layer.

* * * * *